United States Patent
Knecht et al.

(10) Patent No.: US 12,084,985 B2
(45) Date of Patent: Sep. 10, 2024

(54) DIGITAL SHAFT POSITIONING FOR A TURBINE ROTOR

(71) Applicants: Kenneth Knecht, Chugiak, AK (US); Paul Tucker, Washington, UT (US)

(72) Inventors: Kenneth Knecht, Chugiak, AK (US); Paul Tucker, Washington, UT (US)

(*) Notice: Subject to any disclaimer, the term of this patent is extended or adjusted under 35 U.S.C. 154(b) by 914 days.

(21) Appl. No.: 17/099,586

(22) Filed: Nov. 16, 2020

(65) Prior Publication Data
US 2022/0154595 A1 May 19, 2022

(51) Int. Cl.
| | |
|---|---|
| F01D 25/36 | (2006.01) |
| F01D 25/34 | (2006.01) |
| F02C 7/275 | (2006.01) |
| F02C 7/32 | (2006.01) |
| F01D 19/00 | (2006.01) |
| F01D 21/00 | (2006.01) |

(52) U.S. Cl.
CPC .......... *F01D 25/36* (2013.01); *F01D 25/34* (2013.01); *F02C 7/275* (2013.01); *F02C 7/32* (2013.01); *F01D 19/00* (2013.01); *F01D 21/003* (2013.01); *F05D 2220/30* (2013.01); *F05D 2270/114* (2013.01)

(58) Field of Classification Search
CPC .... F02C 7/32; F02C 7/275; F02C 9/28; F01D 25/34; F01D 25/36; F01D 21/003; F01D 21/04; F01D 21/06; F05D 2270/304
See application file for complete search history.

(56) References Cited

U.S. PATENT DOCUMENTS

| | | | |
|---|---|---|---|
| 2,860,713 A | 11/1958 | Peterson | |
| 3,793,905 A | 2/1974 | Black et al. | |
| 4,051,679 A | 10/1977 | Collin | |
| 4,170,905 A | 10/1979 | Collin | |
| 4,271,940 A | 6/1981 | Collin | |
| 4,384,639 A | 5/1983 | Collin | |
| 4,905,810 A * | 3/1990 | Bahrenburg | F01D 25/36 |
| | | | 74/125.5 |
| 5,249,666 A | 10/1993 | Gorski et al. | |
| 9,121,309 B2 | 9/2015 | Geiger | |
| 9,664,070 B1 | 5/2017 | Clauson et al. | |
| 10,125,636 B2 | 11/2018 | Dube et al. | |
| 10,533,459 B1 * | 1/2020 | Knecht | F02C 7/36 |

(Continued)

*Primary Examiner* — Gerald L Sung
*Assistant Examiner* — Rene D Ford
(74) *Attorney, Agent, or Firm* — Christensen O'Connor Johnson Kindness PLLC

(57) ABSTRACT

A turning system for rotating equipment, comprises a motor configured for speed control; a gear connected to the motor, the gear is further connected to the rotating equipment, the motor and gear are configured for rotating the rotating equipment at speeds less than the normal operating speed of the rotating equipment; and a controller configured to perform a method, wherein the method comprises a sequence of steps including, rotating the rotating equipment from a standstill an angular amount of rotation, stopping rotation after moving the angular amount of rotation, and maintaining the rotating equipment at a standstill for a period of time; and repeating the sequence of steps. By performing the sequence of steps after the rotating equipment comes to a standstill, bowing or sagging of the rotating equipment can be prevented, and the rotating equipment is ready to startup at anytime.

7 Claims, 5 Drawing Sheets

(56) References Cited

U.S. PATENT DOCUMENTS

| | | | |
|---|---|---|---|
| 2002/0089324 A1* | 7/2002 | Miyata | G01D 5/145 |
| | | | 324/207.2 |
| 2010/0001721 A1* | 1/2010 | Inotsuka | G01D 5/145 |
| | | | 324/207.25 |
| 2010/0050731 A1* | 3/2010 | Granig | G01D 5/2449 |
| | | | 324/202 |
| 2012/0180498 A1* | 7/2012 | Francisco | F02C 7/268 |
| | | | 60/788 |
| 2012/0329593 A1 | 12/2012 | Larrabee | |
| 2014/0084677 A1* | 3/2014 | Haillot | F02C 7/36 |
| | | | 307/9.1 |
| 2016/0230771 A1 | 8/2016 | Dobat et al. | |
| 2017/0254666 A1* | 9/2017 | Ikeda | G01D 5/2449 |
| 2018/0202315 A1* | 7/2018 | Coldwate | H02K 11/25 |
| 2020/0173811 A1* | 6/2020 | Granig | G01D 5/145 |
| 2020/0235633 A1* | 7/2020 | Tanaka | F02B 37/186 |
| 2022/0154594 A1* | 5/2022 | Lukovic | F02C 7/275 |

\* cited by examiner

DIGITAL SHAFT POSITIONING FOR A TURBINE ROTOR

BACKGROUND

In turbines and other heavy rotating equipment, rotors having a long span between supporting bearings will sag causing a bow in the rotor. This condition is caused by a cold or hot rotor at a standstill. With a bow in the rotor, the vibration level during rotor acceleration (startup), and at full speed, will vibrate. This high vibration can be enough to damage the machine or cause a trip failed start. The original manufacturers designed rotor turning systems to prevent rotor bow at shut down. The turning gear systems are also used to remove the rotor bow when the cold rotor is at a standstill for extended amounts of time. This prestart-up turning gear time is specified by the OEM. During this time of turning a cold rotor to remove the bow, the machine is not available to run. This causes delays in the startup of the machine for service. This turning gear time has created wear issues on the turbine wheel attachment location of turbine buckets/blades. When this wear becomes excessive, the attachment position can be coated with an anti-rock coating for a temporary repair. Over time, with more turning gear time, the coating will wear out and ultimately turbine wheel replacement is required.

Typical shut down of rotors require rotors to be continually rolling via electric motors or moved a specified degree using a mechanical/hydraulic system. These systems are preset and not adjustable.

FIG. 1 is a simplified schematic illustration of a conventional turning system 100. The system includes an electrically powered motor 108 connected via a clutch system 106 to a turning gear 104. The turning gear 104 is connected to the turbine rotor or shaft, which is required to be turned with the turning gear system 100 at low revolutions to prevent the bowing of the turbine rotor or shaft. Depending on the exact configuration of the turbine, the turning gear 104 and clutch system 106 can be of varying designs. It is also appreciated that the turning gear 104 itself can be connected within a larger gearbox assembly to any gear or shaft, which is then connected to the turbine rotor. The electrical motor 108 can an asynchronous alternating current motor known in the art.

SUMMARY

In one embodiment, a turning system for rotating equipment comprises a motor configured for speed control; a gear connected to the motor, the gear is further connected to the rotating equipment, the motor and gear are configured for rotating the rotating equipment at speeds less than the normal operating speed of the rotating equipment; and a controller configured to perform a method, wherein the method comprises performing a sequence of steps including, rotating the rotating equipment from a standstill an angular amount of rotation, stopping rotation after moving the angular amount of rotation, and maintaining the rotating equipment at a standstill for a period of time; and repeating the sequence of steps.

In one embodiment, the angular amount is stopped at a new position less than one full rotation.

In one embodiment, the turning system comprises an angular position encoder mounted radially on a rotor or a coupling directly connected to the rotor.

In one embodiment, the angular position encoder has a split-ring.

In one embodiment, the turning system comprises an angular position encoder mounted axially on an end of a shaft indirectly connected to the rotating equipment via one or more gears.

In one embodiment, the angular position encoder is configured to calculate the angular position of the rotating equipment based on a gear ratio other than 1:1.

In one embodiment, the rotating equipment is a turbine rotor.

In one embodiment, the controller is further configured to end repeating the sequence of steps based on a start command or a stop command.

In one embodiment, the angular amount of rotation and the period of time at a standstill are changeable through a user interface.

In one embodiment, the turning system comprises a non-contact magnetic angular position encoder.

In one embodiment, a method of preventing bowing of a rotor comprises while the rotating equipment is at a standstill, performing a sequence of steps including, rotating the rotor from standstill an angular amount of rotation, stopping rotation after moving the angular amount of rotation, and maintaining the rotor at a standstill for a period of time; and repeating the sequence of steps until fully stopping the rotor or starting the rotor.

In one embodiment, the method further comprises changing the angular amount of rotation or the period of time at a standstill through a user interface.

In one embodiment, the method further comprises allowing the rotor to coast down from a normal operating speed to a lower speed.

In one embodiment, the method further comprises, after coasting to the lower speed, turning the rotor at a constant first turning speed for a first period of time.

In one embodiment, the method further comprises, after the first period of time expires, turning the rotor at a constant second turning speed lower than the first turning speed for a second period of time.

In one embodiment, the method further comprises, after the second period of time expires, bringing the rotor to a standstill.

In one embodiment, a method for making rotating equipment with a turning system comprises mounting an angular position encoder that determines angular position of a rotor; configuring an AC motor with a revolutions encoder, wherein the AC motor is connected to the rotating equipment through a turning gear; and configuring a controller controlling the AC motor, the controller is configured to perform a sequence of a sequence of steps including, rotating the rotor from a standstill an angular amount of rotation, stopping rotation after moving the angular amount of rotation, and maintaining the rotor at a standstill for a period of time; and repeating the sequence of steps.

In one embodiment, the angular position encoder has a split ring mounted radially on the rotor or on a coupling connected to the rotor.

In one embodiment, the angular position encoder is axially mounted to a shaft indirectly connected to the rotating equipment via one or more gears.

In one embodiment, the angular position encoder is a non-contact magnetic encoder.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

This disclosure is related to heavy rotating equipment, usually requiring an accessory turning system to constantly rotate the shaft or rotor at a constant speed to keep the shaft or rotor from bowing. Specifically, this disclosure describes a turning system and method of turning to prevent rotor/shaft bowing.

Figure 2:
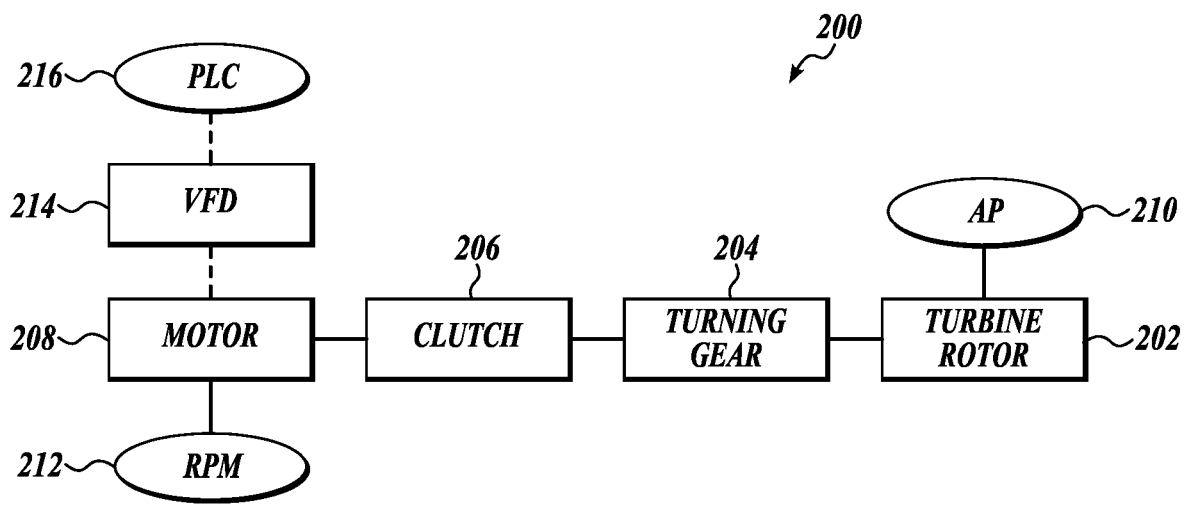
FIG. 2 is a schematic illustration of a turning gear system in accordance with embodiments of the present disclosure.

Referring to FIG. 2, a schematic diagram of a modified turning system 200 is illustrated. It is to be appreciated that turbines include many more systems and instruments than shown in FIG. 2. The simplified schematic is to illustrate a modification of existing turbines and turning system. Turbines that use turning gears are generally the heavy industrial kind, but, the size of the turbine is not a limitation. The type of the turbine is also not particularly limited. The disclosure also applies to all rotors whether in turbines or compressors, and also applies to all shafts in general that may experience bowing if left for extended periods of time without turning. For example, propeller shafts on larger ships also use a turning gear to prevent the propeller shaft from bowing.

The configuration of any new or existing rotor and gearbox, if any, can dictate where the turning gear 204 is mounted. The turning system of this disclosure can be included with any newly manufactured turbine or can be retro-fitted to existing turbines. In one embodiment, the turning gear 204 is mounted directly on the rotor 202. In one embodiment, the turning gear 204 is mounted to a coupling which is then connected to the rotor 202. In one embodiment, the turning gear 204 is mounted to a gearbox on any one of the reduction gears or gear shafts, which is then connected to the rotor 202.

According to this disclosure, the turning system 200 includes a motor 208 with variable frequency drive 214 (VFD) and controller 216, a motor revolutions encoder 212, and an encoder 210 for angular position monitoring, and a programmable logic controller (PLC) which can be incorporated into the VFD 214. The motor revolutions encoder 212 can be mounted to the motor shaft or internally within the motor 208, or to any shaft from which motor revolutions can be determined. The encoder 210 for angular position monitoring can be mounted directly on the rotor 202, to any coupling connected to the rotor 202, to any shaft or any gear which is then connected to the rotor 202. In any case, the encoder 210 is for determining the angular position of the rotor 202 with respect to a reference point on the rotor circumference. For example, encoder 210 can be used to determine the angular position of the rotor from 0 to 360 degrees of rotation. In one embodiment, angular position encoder 210 can be mounted radially, i.e., on the circumference of the rotor 202 or any coupling, shaft, or gear connected to the rotor 202. In one embodiment, angular position encoder 210 can be mounted axially, i.e., on the end of the rotor 202 or any coupling, shaft, or gear connected to the rotor 202. In all cases, the angular position encoder 210 is used to determine the angular position of rotor 202 either directly or indirectly by applying a ratio when the encoder 210 is not directly measuring the rotor 202. In one embodiment, the angular position encoder 210 determines the true rotor position in degrees with or without gear ratio.

Figure 1:
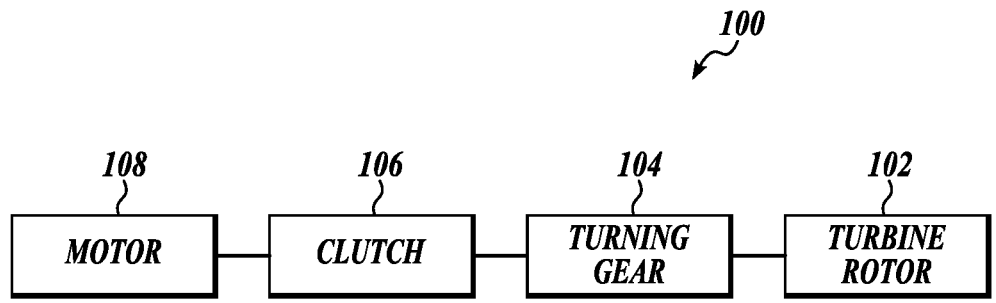
FIG. 1 is a schematic illustration of a conventional turning gear system used on a turbine.

Turbines use a relatively small turning gear AC motor 208 (approx. 10 HP) for turning gear and break away for turbine startup. In one embodiment, the motor 108 can be a direct current driven motor. If a DC motor is included as original equipment, an AC motor can be used in combination with or alternative to the DC motor. The motor, turning gear, and clutch of FIG. 1 is sometimes original equipment and can operate as was originally designed even when modified according to FIG. 2. Therefore, this disclosure describes the modifications in the system and operation without fully describing all the conventional operations performed with the system 100 of FIG. 1 as it may only obscure aspects of this disclosure. One advantage to having the original equipment is that if there is a fault with the system of FIG. 2, the system can be operated as per the original design. However, while FIG. 2 can represent a retro-fitted existing system, FIG. 2 also represents original designs in future installations. Additionally, turbines may use a large starting motor via a torque convertor for starting the turbine. Some of the larger turbines use the generator as a motor for starting. The additional motors and generators of the turbine do not need to be illustrated for understanding this disclosure.

The VFD 214 is a device that can control the speed of the AC motor 208, and thus, the turning gear 204 and revolutions and angular position of the rotor 202. The VFD 214 can also control the starting and stopping of the motor 208, including controlling acceleration and deacceleration, and monitoring torque output. The motor 208 is connected to turning gear 204, which turns the rotor 202. A VFD 214 works as the name suggests by varying the frequency to control the speed of an AC motor. The supply AC is run by a rectifier to convert from AC to DC. Then, the DC is pulse-width modulated to approximate an AC sinusoidal wave of a different frequency than the supply AC. Where the motor 208 is not an AC induction motor, other speed control systems are available for different type motors. In one embodiment, the motor 208 can be a permanent magnet motor.

In one embodiment, the VFD 214 can include a programmable logic controller (PLC) 216. In one embodiment, the PLC 216 is integrated into the VFD 214. In one embodiment, the PLC 216 is a standalone component. In this disclosure, "PLC" is used in its broadest sense to represent any type of computing device which includes hardware circuitry or software or a combination of both hardware and software to execute a set of instructions to control the VFD 214 and motor 208 based on input from instruments, including at least the motor revolutions encoder 212 and the angular position encoder 210. Additionally, the PLC 216 may include a user interface, such as a touch screen, keypad, light pen, mouse, and the like, to allow a user to change instruction parameters based on the particular specifications of the turbine 202. Particularly, as will be described below, the user can program settings for revolutions per minute of the rotor, timing the start of rotation of rotor 202 once it has come to a standstill after a shutdown, and the amount of rotation (in degrees). The PLC 216 may also employ a memory for storing the operating system instructions, and the programmable and changeable instructions for operation of the motor 208. A memory is any device or method where data and instructions are stored in an organized manner, such as on a computer-readable storage medium, such as a hard disk drive, a flash memory, RAM, ROM, or any other type of computer-readable storage medium. The data and instructions are accessed by the controller at any time for use in carrying out the controller instructions. A "computer-readable medium" includes volatile and non-volatile and removable and non-removable media implemented in any method or technology capable of storing information, such as computer readable instructions, data structures, program modules, or other data accessible by the controller.

It is understood that a turbine 202 can include many more instruments than illustrated in FIG. 2. For example, redundant temperature and vibration sensors are usually placed on bearings on the turbine rotor and on any gearbox shafts to indicate impending bearing failure and to prevent a catastrophic failure. Additional rpm sensors can be placed on the turbine 202. In one embodiment, the VFD 214 can use the measurements from these instruments to carry out the programmed instructions.

Figure 3:
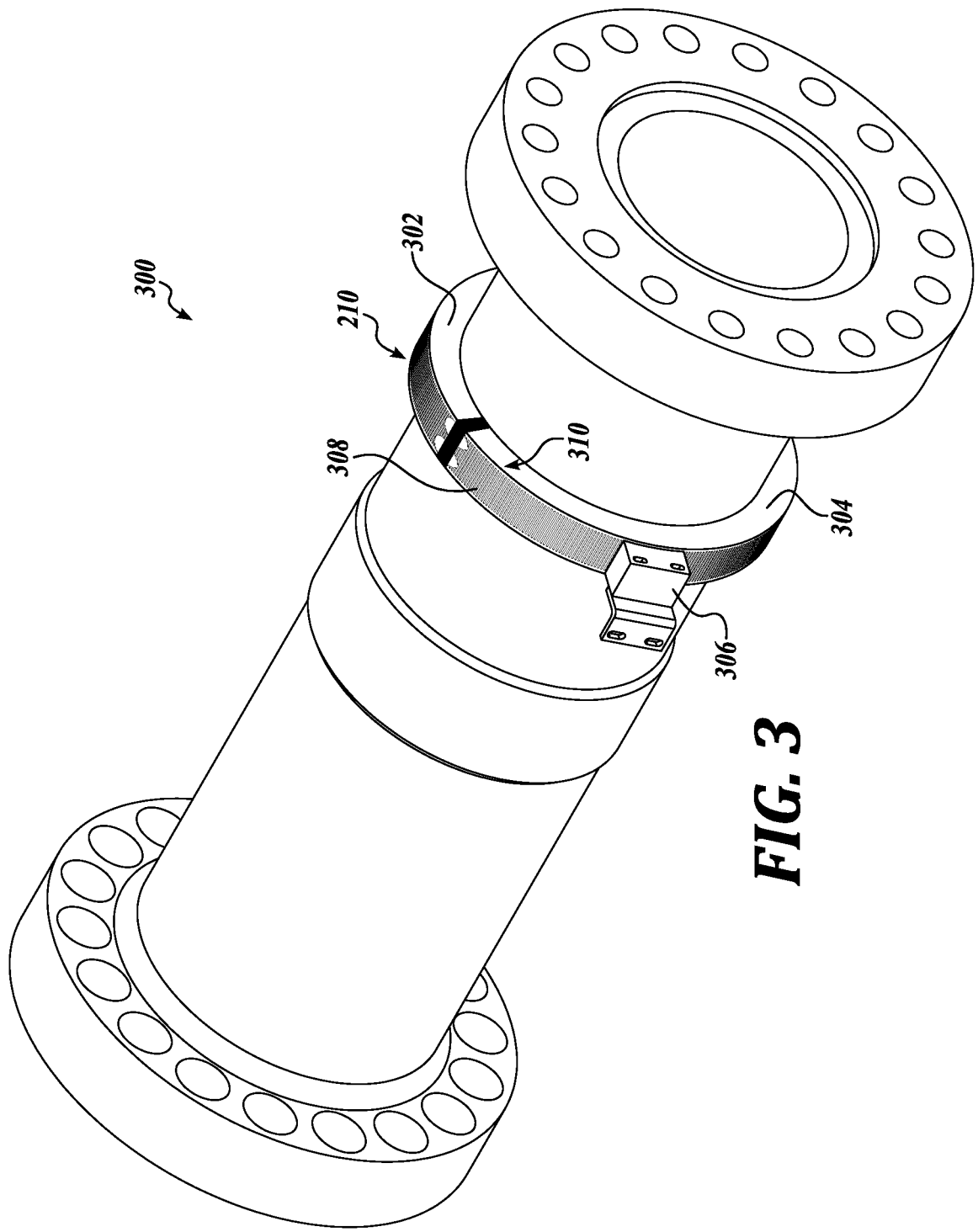
FIG. 3 is a diagrammatical illustration of a split-ring radially-mounted encoder in accordance with one embodiment of the present disclosure.

FIG. 3 is an diagrammatical illustration of an angular position encoder 210 mounted radially on a cylindrical coupling 300. In one embodiment, the coupling 300 can be a coupling directly connected to the rotor 202. In one embodiment, the encoder 210 can be mounted to the rotor 202 itself or on any shaft of any gear connected to the rotor 202. In any case, the encoder 210 can be used to determine the angular position of the rotor 202 based on a reference point, and can be used to determine the angular rotation in degrees of less than one full rotation (360 degrees) of the rotor. In one embodiment, the encoder 210 may be used to determine the revolutions per minute of the rotor 202.

In one embodiment, a variety of detection technologies can be used for the angular position encoder 210. In one embodiment, the angular position encoder 210 includes a toothed gear ring 310 made from a ferrous material. In one embodiment, the toothed gear ring 310 is split into two halves 302 and 304. Each half 302, 304 of the split ring 310 has a plurality of teeth 308 on the exterior circumference of each half of the ring 310. Each individual tooth 308 is aligned axially to the coupling 300, but, the plurality of teeth 308 are placed side-by-side radially. In one embodiment, the split ring 310 can use magnets for determining angular position. In one embodiment, the split ring 310 can use an optical sensor. An advantage of the split ring 310 allows retro-fitting existing turbines with angular position encoders 210. The encoder 210 also includes a sensor 306 which can use the Hall effect to count the teeth 308 as they pass by the sensor. A Hall effect sensor works by detecting the presence of ferrous (iron) materials, such as each tooth of the ring 310 in FIG. 2. The sensor 306 is placed in close proximity to the ring 310 to be able to discern one tooth from the next, and thus, be able to count the teeth as they pass by the sensor 306 and determine an angular position based on the number of teeth that pass by the sensor compared to the total number of teeth around the circumference of the ring 310. In one embodiment, a magnetic sensor can be used. In one embodiment, an optical sensor can be use. In one embodiment, the sensor 306 can be mounted radially. In one embodiment, the sensor 306 can be mounted axially. Regardless of the technology, the angular position encoder is preferably a non-contact sensor, meaning that the sensor 306 does not physical contact the ring.

Figure 4:
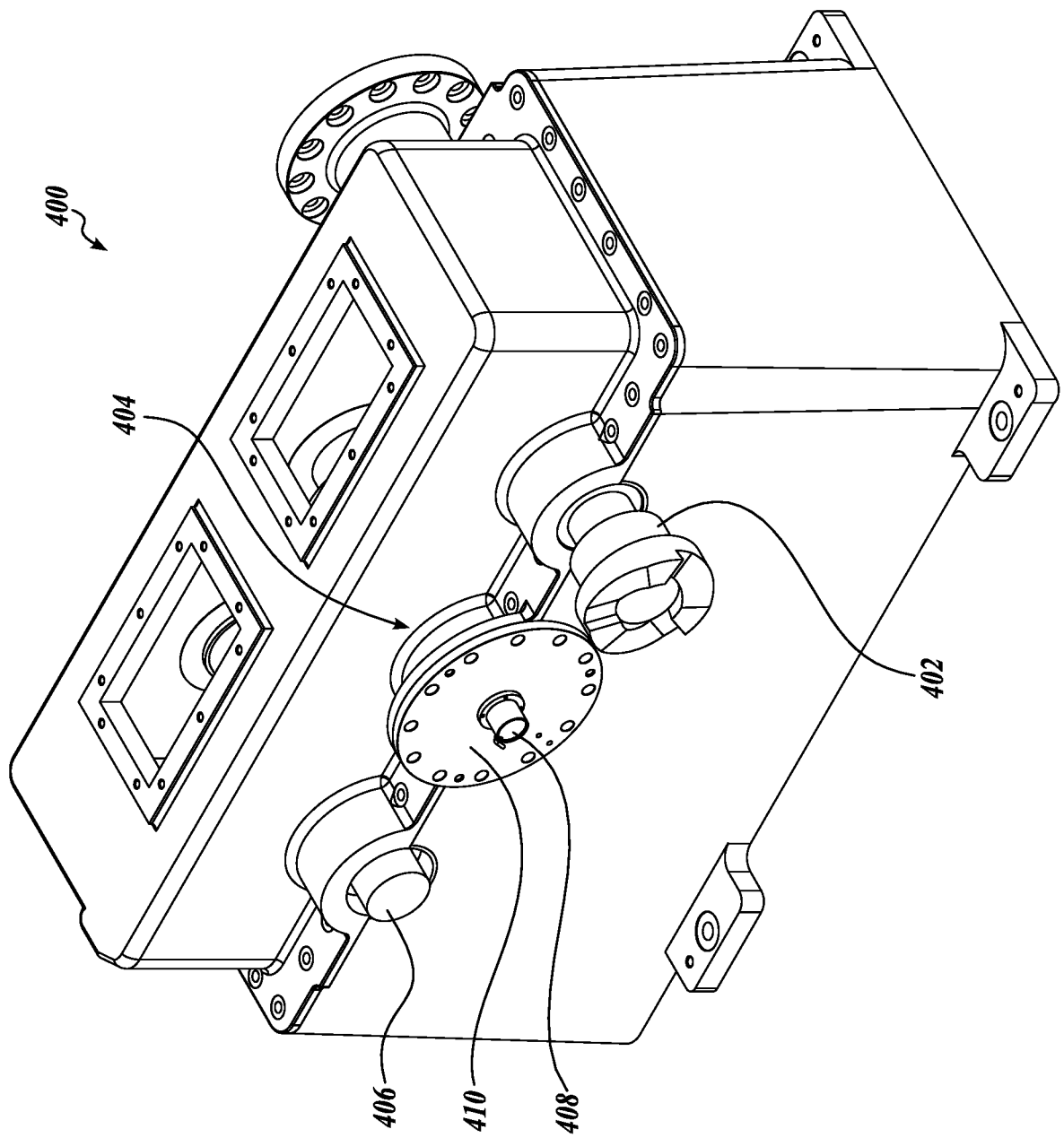
FIG. 4 is a diagrammatical illustration of an axially-mounted encoder in accordance with one embodiment of the present disclosure.

FIG. 4 is a diagrammatical illustration of a gearbox 400. In some embodiments a turbine rotor is connected through a coupling 300 (FIG. 3) to an accessory gearbox 400. The coupling 300 may, for example, be connected to the shaft 402. The shaft 402 may be the power transmission shaft which turns the rotor 202 by a motor (not shown) much larger than the motor 208 of the turning system 200. The power transmission shaft 402 is in turn connected to shaft 404 which can be connected to one or more shafts which operate ancillary systems, such as an oil pump. In one embodiment, the shaft 404 includes the turning gear(s) 204. The power transmission shaft 402 is connected to shaft 404 through the turning gear(s) 204, and the shaft 404 further turns shaft 406 through one or more speed-increasing or speed-decreasing gears. The clutch system 206 may be connected to the exposed flange 410 shown attached to the shaft 404. In normal operation of the turbine at normal operating speeds, the power transmission shaft 402 connected to a main motor (not shown) drives the rotor 202. In shutting down or starting up the turbine, the main motor connected to shaft 402 is stopped or disengaged, and as the rotor 202 begins to slow down, the turning system motor 208 is engaged to turn the rotor 202 at reduced speeds. The speed at which the turning motor 208 engages the power transmission shaft 402 is dependent on the specifications of each turbine.

Figure 5:
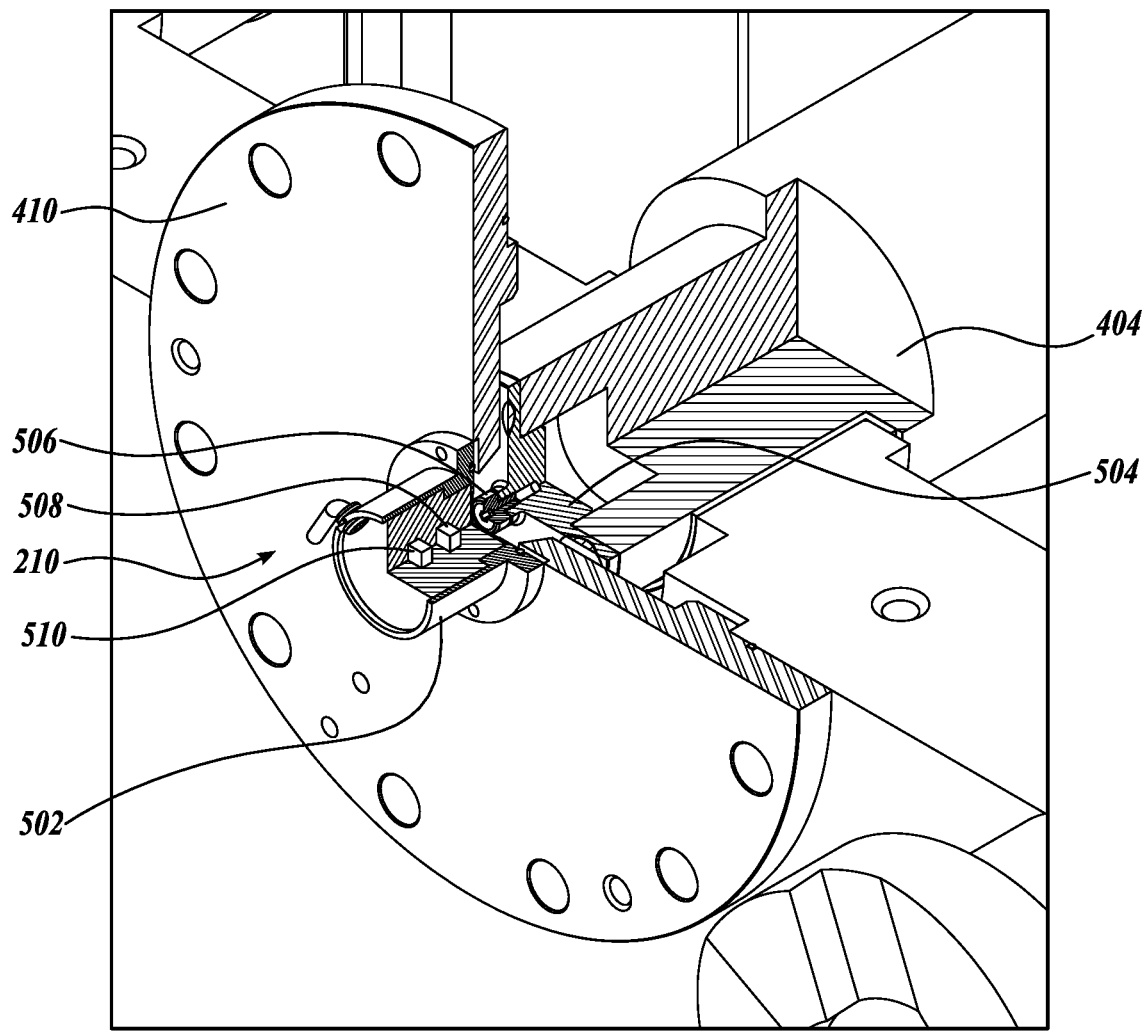
FIG. 5 is a detailed diagrammatical illustration of the axially-mounted encoder of FIG. 4.

FIG. 5 is a diagrammatical illustration of a detailed cross section of the end of the shaft 404 showing a second implementation of an angular position encoder 210. This implementation includes an encoder 502 that can be co-axially mounted in proximity from the end of a shaft 404 which is not directly connected to the rotor 202 and therefore, turns at a different speed compared to the rotor 202. Encoder 502 is constructed, for example, by potting electronic components within an epoxy resin. In one embodiment, a Hall effect sensor 510 and an internal magnet 508 are placed within encoder 502. The encoder 502 is mounted stationary with respect to the shaft 404. A second external magnet 506 is placed axially on the end of the shaft 404. The magnet 506 is held in place on the shaft 404 by an adaptor 504. The adaptor 504 can be designed to fit the any shaft design. In one embodiment, the adaptor 504 has a plug portion which fits into an axial bore in the shaft 404, and a flange portion which rests against the axial end of the shaft 404. An O-ring can be mounted between the flange portion of the adaptor 504 and the flange 410. Therefore, the adaptor 504 is designed to hold magnet 506 stationary with respect to the shaft 404 so that magnet spins at the same revolutions as the shaft 404 while the encoder 502 remains stationary. The Hall-effect sensor within encoder 502 is capable of discriminating the changes in the magnetic fields which couple the internal and external magnet 506 and translate the change in magnetic field to indicate an angular position. Electronics either within the encoder 502 or in the PLC 216 can also take into consideration the gear ratio between shaft 404 and shaft 402, which turns the same as rotor 202. Therefore, the angular position of rotor 202 is determined by measuring the angular position of a shaft, such as shaft 404, that turns at as gear ratio with respect to the rotor 202.

In one embodiment, both the split-ring encoder of FIG. 3 and axially-mounted encoder of FIGS. 4 and 5 are non-contact encoders, meaning that the link between the rotating part and the sensor of the encoders uses a magnet type coupling.

While various angular position encoders are described, the disclosure is not limited to any particular configuration or detection technology. For example, optical encoders can also be adapted to use in the disclosure, and other locations for placing the encoder 210 can include the inside of a bearing housing. Furthermore, the exact configuration of the turbine can dictate whether use a radially-mounted or end-mounted angular position encoder 210 and the detection technology Digital Shaft Positioning (DSP)

In one embodiment, the system 200 of FIG. 2 is used in a method for digitally positioning and rotating a shaft or rotor 202 a prescribed rotational degree amount at a specified time. The system 200 of this disclosure enables the turbine 100% availability to run. Due to the rotor being rotated to a specific degree with an equal amount of time between positioning, the rotor condition will remain straight. Flexible rotors with long spans between supporting bearings will no longer sag causing a rotor bow.

Typical shut down of rotors require rotors to be continually rolling via electric motors or moved a specified degree using a mechanical and hydraulic system. These systems are preset and not adjustable.

The digital shaft positioning of this disclosure is a method to continually turn the rotor at an adjustable rate. This rate is then reduced to a zero speed with the shaft at a standstill. Once the rotor is at a standstill an adjustable time span is started. At the end of this time span the rotor is then rotated to a new adjustable position. The delta or change in angular position from a standstill to the new position is predetermined and adjustable. The disclosed method is designed for turbine rotors that need to be available 24 hours per day with an unlimited time between running. The disclosed method creates a 100% availability time for immediate start up with major reduction in typical component wear.

The electric motor 208 used to turn a reduction gear 204 which turns the rotor 202 is controlled using the VFD 214. The VFD 214 is programed to accelerate and de-accelerate at very detailed ramp rates per turbine model specifications. The VFD 214 is used for continuous rotation at a slower rate than the original speed. In one embodiment, the VFD 214 is also used to turn the electric motor 208 a programed amount of degrees from a standstill under certain conditions.

As described herein, a first encoder 212 monitors rotations for speed control of the electric motor 208. This provides a feedback loop to control the motor 208 revolutions, motor speed, motor acceleration, and de-acceleration.

The second encoder 210 is used to monitor turbine rotor 202 position in degrees. The mounting of the encoder 210 will be dependent on the configuration of each turbine. In one embodiment, the second encoder 210 is radially-mounted or axially-mounted to a shaft. Further, the second encoder 210 can be directly mounted to the rotor shaft, meaning there is not gear ratio between encoder 210 and the rotor 210. In one embodiment, there is a gear ratio between where the second encoder 210 is mounted and the rotor 202. In this case, the second encoder 210 can be programmed to adjust for any mechanical ratio if the second encoder 210 is mounted via a ratio of rotor 202 revolution.

In one embodiment, the aim of the disclosure is shaft or rotor 202 positioning at a pre-determined angle when at a standstill or stopped. This angle is specific for each individual type of turbine rotor. In addition, the time at this pre-determined angle is specific for each individual type of turbine rotor. Both the digital shaft positioning and time can be changed depending on operational requirements.

In one embodiment, the system 200 goes through the following steps to start the turbine. A command initiates the turbine start-up sequence. The motor 208 starts and moves the rotor 202 from a standstill to the turning gear speed at a controlled ramp-up rate per specifications. The motor 208 controls the rotor rpm acceleration at a predetermined rate to the turning specification, for example, 6 rpm turning gear speed. After a predetermined time at the turning specification, the turbine is loaded gradually to full speed, and the motor 208 and turning gear 204 are disengaged.

In one embodiment, the system 200 goes through the following steps to stop the turbine. A command initiates the turbine shutdown sequence. The rotor is allowed to coast down per specifications. When zero speed is accomplished, turning gear 204 is engaged at a controlled ramp rate from stand still to full turning gear speed, for example, 6 rpm. Thereafter, turning gear speed is maintained until a stop command is given to work on the rotor, or if work can be performed without completely stopping the turbine, the start-up command is given. A problem arises when the turbine has to be shutdown for an extended period of time. Constant turning of the rotor even at turning speeds according to the specification can cause wear.

In one embodiment, referring to FIG. 6, and using the system of FIG. 2, the turbine shut down sequence 600 is as follows.

In block 602, the rotor coast down to zero speed is performed according to the above-described sequence adjusted to the specifications for the turbine in question. From block 602, the method 600 enters block 604.

In block 604, when zero speed for the turbine is reached, the turning gear 204 is engaged at a controlled ramp rate from stand still to the turning speed, for example, 6 rpm or to the turning speed according to turbine specifications. From block 604, the method 600 enters block 606.

In block 606, the turning speed according to specification is maintained for a predetermined time, for example, 10 minutes. From block 606, the method 600 enters block 608.

In block 608, at the expiration of 10 minutes or the time called for in the specification, the motor 208 reduces rotor rpm at a controlled de-acceleration rate to a lower turning speed of, for example, 3 rpm or at the speed and time period per the turbine specification. From block 608, the method 600 enters block 610. In one embodiment, all speeds and times are programmable and changeable through the PLC 216.

In block 610, motor 208 maintains the second turning speed for 180 minutes, or the time called for in the specifications. From block 610, the method 600 enters block 612.

In block 612, at expiration of the 180 minutes, motor 208 reduces rotor turning speed from the second turning speed of 3 rpm to zero speed at a controlled de-acceleration rate. From block 610, the method 600 enters block 614.

In block 614, zero speed is maintained for 60 minutes, or any period according to the turbine specifications. From block 614, the method enters block 616.

In block 616, at the expiration of 60 minutes, or the time called for in the specification, the motor 208 breaks away rotor from stand still and rotates the shaft or rotor 202 an angular amount less than one full rotation, for example, about 120 degrees, or the degrees called for in the specifications. From block 616, the method 600 enters block 618.

In block 618, zero speed at stand still is resumed in the new angular position and maintained for 60 minutes, or the time called for in the specifications. From block 618, the method 600 enters block 620.

In block 620, the sequence of steps of moving the rotor an angular amount to a new angular position less than a full turn, maintaining the new angular position at a standstill for a predetermined time, and then rotating another angular amount to a new angular position, is repeated until a full stop or a start command is given. A full stop command can be given to begin work necessitating complete stopping of the rotor. When work does not require complete stopping of the rotor, work is completed while carrying out the sequence above, and the turbine can be started at any time thereafter to resume normal operations. As long as neither of the conditions in block 620 is true (false condition), the method 600 returns to block 616 followed by block 618 to continuously perform the sequence of steps to move rotor an angular amount to new angular position, bring rotor to a standstill, maintain at a standstill, and then move rotor an angular amount to new angular position. If either of the conditions in block 620 is true, then, from block 620, the method enters block 622.

In embodiment, the angular amounts (or positions) and the times at standstill are programmable and changeable through the PLC 216. In one embodiment, the angular amounts of movement and the times at standstill need not be constant, but, can be programmed to increase or decrease as more time elapses. In one embodiment, about 120 degrees of rotation is used for purposes of maintaining lubrication, so that the shaft for example could move total of 480 degrees, which is equal to 120 degrees for each new position.

In block 622, the service on the turbine or rotor can be completed while the turbine and rotor are no longer being rotated until the work finishes, or the turbine is ready to start to resume normal operations and is startup according to the startup procedure described.

The examples given of turning speeds of 6 rpm and 3 rpm, the time durations in any step, and the angular amounts and positions, are site specific and can be changed as required via a user interface communicating with the PLC 216. The stand still times given as examples are site specific and can be changed as required. Shaft break away, acceleration rate, and jaw clutch engagement sequence is site specific and can be changed as required through the PLC 216.

Figure 6:
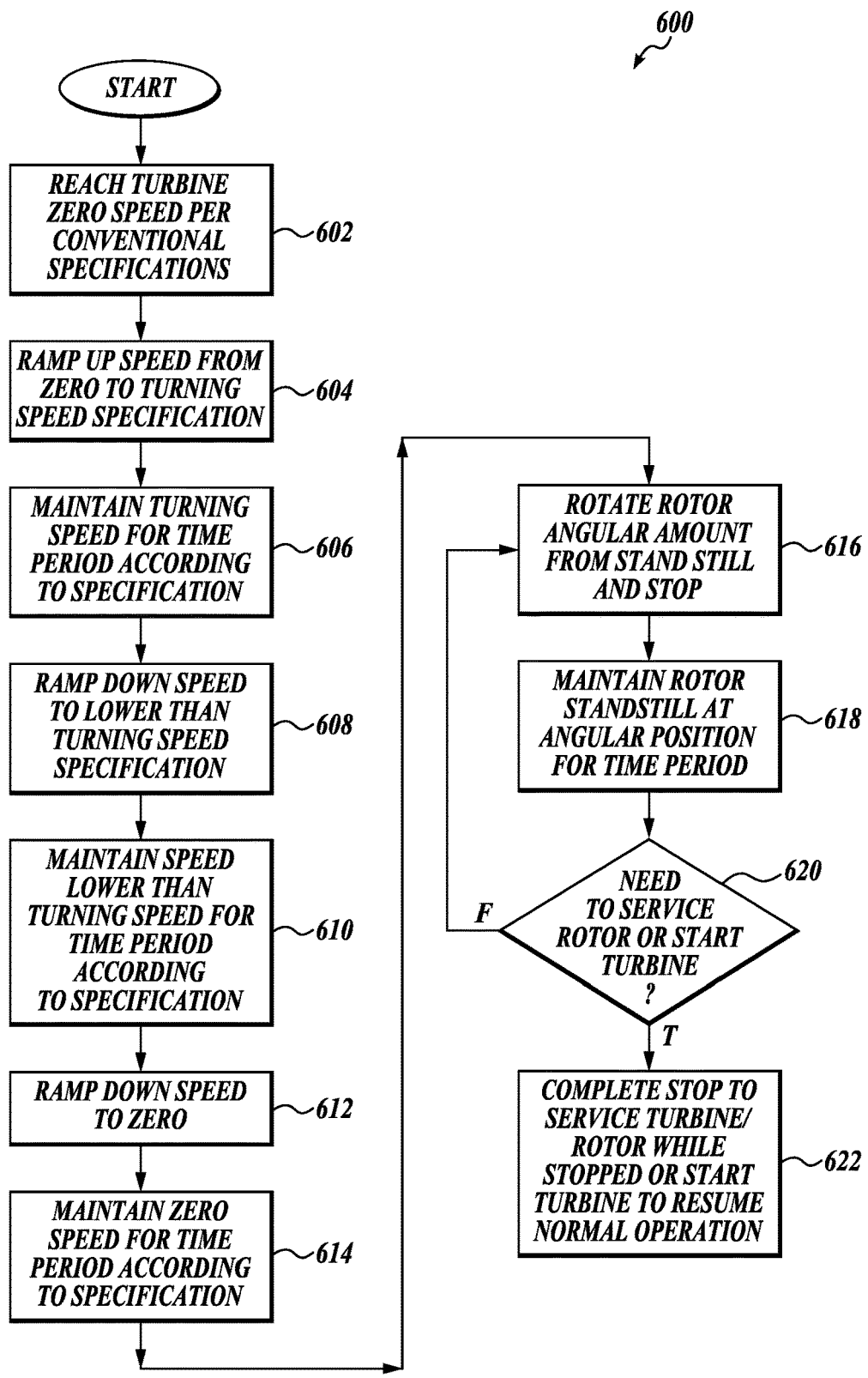
FIG. 6 is a flow diagram of a method of digitally positioning a turbine in accordance with embodiments of this disclosure.

Using the modified turning system 200 as illustrated in FIG. 2 and per the method described in FIG. 6, a turbine or other rotating equipment can be made available 24 hours per day, 365 days a year, to start normal operations. Furthermore, the wear on the turbine is reduced, and the electrical station service cost can be reduced when using the systems and methods described. Representative embodiments may include the following.

In one embodiment, a turning system for rotating equipment comprises a motor configured for speed control; a gear connected to the motor, the gear is further connected to the rotating equipment, the motor and gear are configured for rotating the rotating equipment at speeds less than the normal operating speed of the rotating equipment; and a controller configured to perform a method, wherein the method comprises performing a sequence of steps including, rotating the rotating equipment from a standstill an angular amount of rotation, stopping rotation after moving the angular amount of rotation, and maintaining the rotating equipment at a standstill for a period of time; and repeating the sequence of steps.

In one embodiment, the angular amount is stopped at a new position less than one full rotation.

In one embodiment, the turning system comprises an angular position encoder mounted radially on a rotor or a coupling directly connected to the rotor.

In one embodiment, the angular position encoder has a split-ring.

In one embodiment, the turning system comprises an angular position encoder mounted axially on an end of a shaft indirectly connected to the rotating equipment via one or more gears.

In one embodiment, the angular position encoder is configured to calculate the angular position of the rotating equipment based on a gear ratio other than 1:1.

In one embodiment, the rotating equipment is a turbine rotor.

In one embodiment, the controller is further configured to end repeating the sequence of steps based on a start command or a stop command.

In one embodiment, the angular amount of rotation and the period of time at a standstill are changeable through a user interface.

In one embodiment, the turning system comprises a non-contact magnetic angular position encoder.

In one embodiment, a method of preventing bowing of a rotor comprises while the rotating equipment is at a standstill, performing a sequence of steps including, rotating the rotor from standstill an angular amount of rotation, stopping rotation after moving the angular amount of rotation, and maintaining the rotor at a standstill for a period of time; and repeating the sequence of steps until fully stopping the rotor or starting the rotor.

In one embodiment, the method further comprises changing the angular amount of rotation or the period of time at a standstill through a user interface.

In one embodiment, the method further comprises allowing the rotor to coast down from a normal operating speed to a lower speed.

In one embodiment, the method further comprises, after coasting to the lower speed, turning the rotor at a constant first turning speed for a first period of time.

In one embodiment, the method further comprises, after the first period of time expires, turning the rotor at a constant second turning speed lower than the first turning speed for a second period of time.

In one embodiment, the method further comprises, after the second period of time expires, bringing the rotor to a standstill.

In one embodiment, a method for making rotating equipment with a turning system comprises mounting an angular position encoder that determines angular position of a rotor; configuring an AC motor with a revolutions encoder, wherein the AC motor is connected to the rotating equipment through a turning gear; and configuring a controller controlling the AC motor, the controller is configured to perform a sequence of a sequence of steps including, rotating the rotor from a standstill an angular amount of rotation, stopping rotation after moving the angular amount of rotation, and maintaining the rotor at a standstill for a period of time; and repeating the sequence of steps.

In one embodiment, the angular position encoder has a split ring mounted radially on the rotor or on a coupling connected to the rotor.

In one embodiment, the angular position encoder is axially mounted to a shaft indirectly connected to the rotating equipment via one or more gears.

In one embodiment, the angular position encoder is a non-contact magnetic encoder.

While illustrative embodiments have been illustrated and described, it will be appreciated that various changes can be made therein without departing from the spirit and scope of the invention.

The embodiments of the invention in which an exclusive property or privilege is claimed are defined as follows:

1. A turning system for rotating equipment, comprising:
   a motor configured for speed control;
   a gear connected to the motor, the gear is further connected to the rotating equipment, the motor and gear are configured for rotating the rotating equipment at speeds less than the normal operating speed of the rotating equipment;
   an angular position encoder mounted axially on an end of a shaft indirectly connected to the rotating equipment via one or more additional gears; and
   a controller configured to perform a method, comprising:
      a sequence of steps including, rotating the rotating equipment from a standstill an angular amount of rotation, stopping rotation after moving the angular amount of rotation, and maintaining the rotating equipment at a standstill for a period of time; and
      repeating the sequence of steps.

2. The turning system of claim 1, wherein the angular amount is stopped at a new position less than one full rotation.

3. The turning system of claim 1, wherein the angular position encoder is configured to calculate the angular position of the rotating equipment based on a gear ratio other than 1:1.

4. The turning system of claim 1, wherein the rotating equipment is a turbine rotor.

5. The turning system of claim 1, wherein the controller is further configured to end repeating the sequence of steps based on a start command or a stop command.

6. The turning system of claim 1, wherein the angular amount of rotation and the period of time at a standstill are changeable through a user interface.

7. The turning system of claim 1, comprising a non-contact magnetic angular position encoder.

* * * * *